I. B. CASEY.
POTATO DIGGER.
APPLICATION FILED MAY 10, 1910.

1,049,340.

Patented Jan. 7, 1913.

2 SHEETS—SHEET 1.

WITNESSES
H. E. Smith
N. Becht

INVENTOR
Irby B. Casey
BY Mason, Fenwick & Lawrence
his ATTORNEYS

I. B. CASEY.
POTATO DIGGER.
APPLICATION FILED MAY 10, 1910.
1,049,340.
Patented Jan. 7, 1913.
2 SHEETS—SHEET 2.
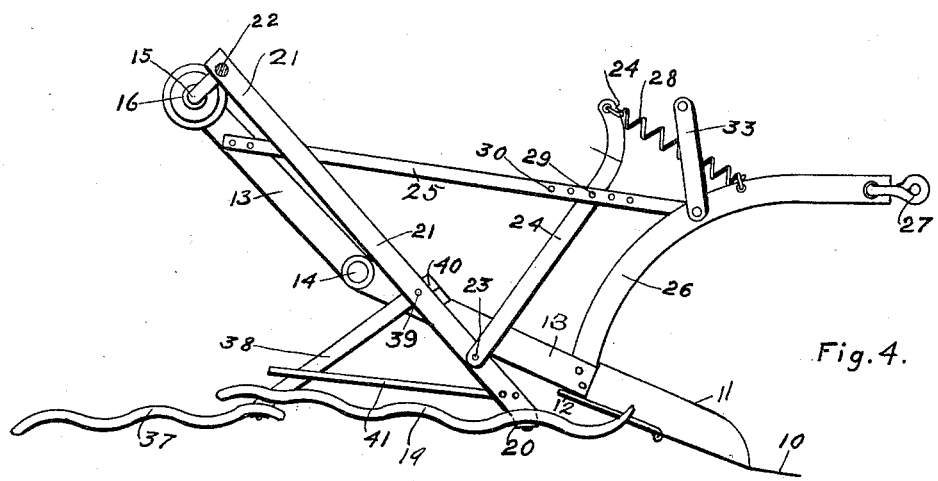
Fig. 4.
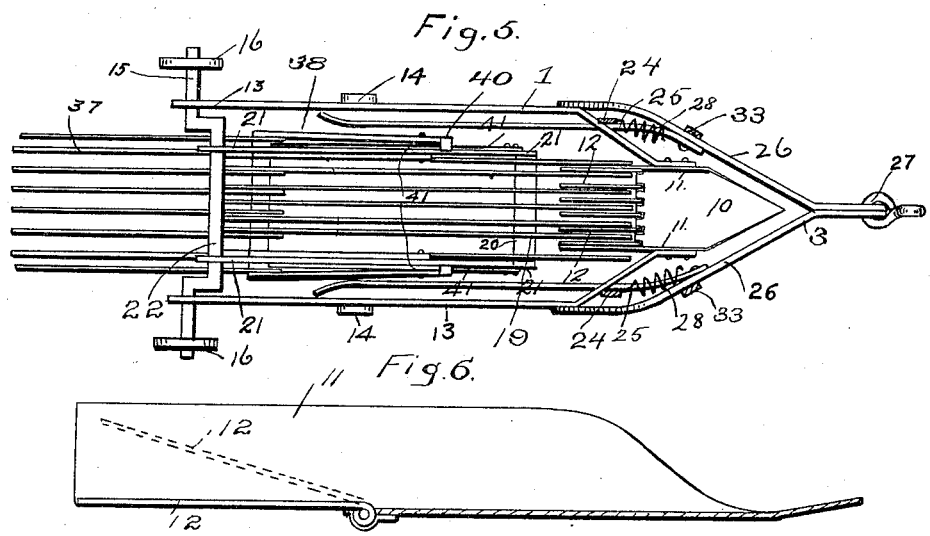
Fig. 5.
Fig. 6.
WITNESSES
H. E. Smith
N Becht
INVENTOR
Irby B Casey
BY Mason, Fenwick & Lawrence
his ATTORNEYs.

UNITED STATES PATENT OFFICE.

IRBY B. CASEY, OF SPOKANE, WASHINGTON.

POTATO-DIGGER.

1,049,340. Specification of Letters Patent. Patented Jan. 7, 1913.

Application filed May 10, 1910. Serial No. 560,537.

*To all whom it may concern:*

Be it known that I, IRBY B. CASEY, a citizen of the United States, residing at Spokane, in the county of Spokane and State of Washington, have invented certain new and useful Improvements in Potato-Diggers, of which the following is a specification.

This invention relates to potato diggers, and the object is to provide novel and improved means for operating the shovel, separating the potatoes from the soil and delivering them in a row at the rear of the machine.

The invention consists further in the novel combination and arrangement of parts to be hereinafter fully described, and specifically pointed out in the claims, reference being had to the drawings hereto annexed, in which—

Figure 1:
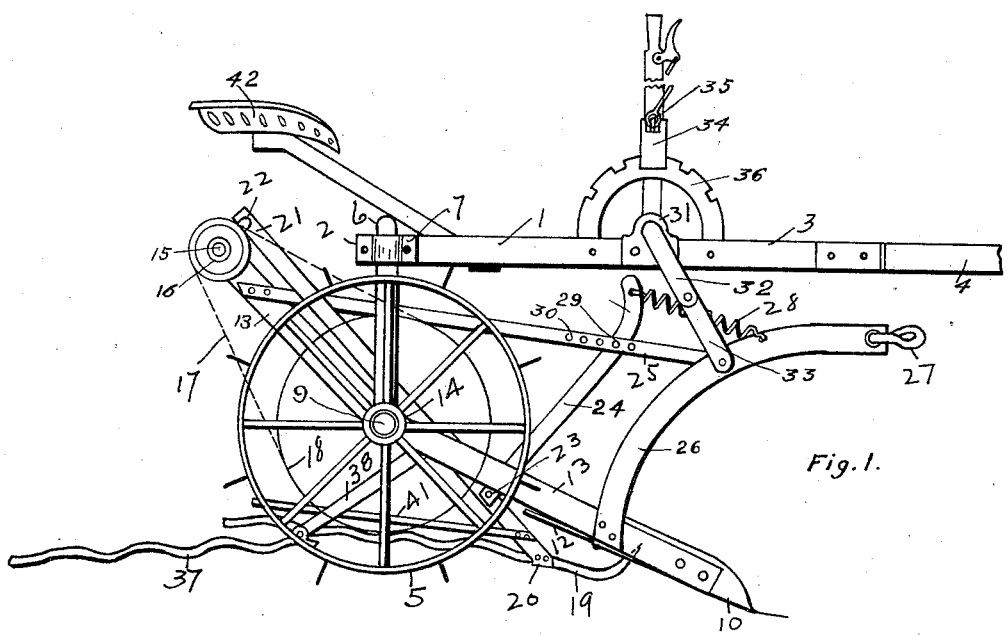
Figure 2:
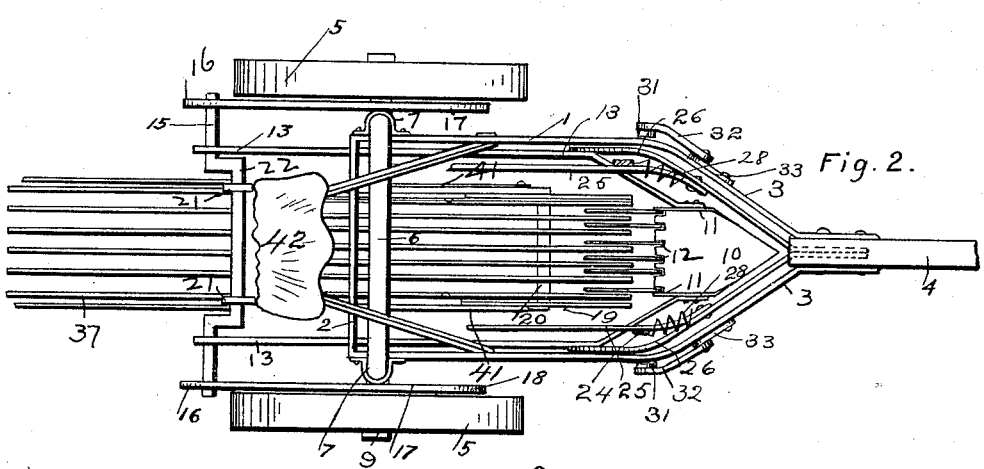
Figure 3:
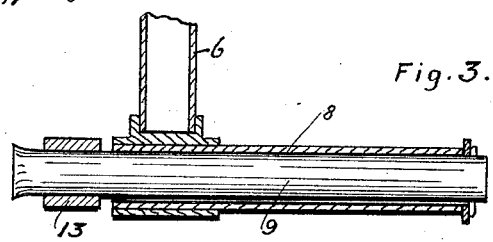

Figure 1 is an elevation of the digger. Fig. 2 is a plan view thereof omitting transverse shaft 31 and certain connected devices. Fig. 3 is a detail of a portion of the axle of the machine. Fig. 4 is an elevation of the digging mechanism, removed from the frame of the machine. Fig. 5 is a plan view thereof, and Fig. 6 is a longitudinal section of the shovel.

Referring to the drawings, the main frame of the machine comprises spaced parallel side bars 1, connected at their rear ends by a cross bar 2, and made converging at their front ends as indicated at 3, said converging ends being connected to a draft tongue 4. This frame is mounted at its rear end on a pair of wheels 5, carried on an arched axle 6 extending across the top of the side bars 1, and secured thereto by clips 7. The depending portions of the axle carry tubular spindles 8 on which the wheels are loosely mounted. In the spindles are rigidly fastened stems 9, which project from the inner ends thereof, and which are for a purpose to be hereinafter described.

The shovel comprises a bottom 10, pointed at its front end, and sides 11. To the rear end of the shovel are hinged, so as to work in a vertical plane, a series of tines 12 extending rearwardly from the shovel. The sides 11 of the shovel are continued throughout the entire length of the tines. The object of pivotally connecting the tines to the shovel, is to permit them to swing upwardly in case a stone or rock comes between them, and the front end of the vibrating screen to be presently described. To the sides 11 of the shovel, at their rear ends, are secured hangers 13, extending upwardly and rearwardly, and having bearing openings 14 intermediate their ends, whereby they are pivotally mounted on the inwardly projecting ends of the stems 9. The upper ends of the hangers have bearings in which a crank shaft 15 is journaled, said shaft extending transversely of the machine, and being fitted with pulleys or sprocket wheels 16 connected by belts or chains 17 to pulleys or sprockets 18 made fast to the wheels 5, whereby the motion of said wheels is transmitted to the crank shaft.

Between the tines 12 work the front ends of the tines 19 of a vibrating screen, said screen comprising a series of such tines suitably spaced apart and extending parallel, in a wavy line, in the direction of the length of the machine, the front end of the tines being upwardly presented and pointed. The tines 19 are fastened to a transverse bar 20, to the ends of which are connected pitmen 21, connected to the crank 22 of the shaft 15, for imparting a vibratory movement to the screen when the machine is in motion. The pitmen are pivotally connected intermediate their ends as indicated at 23, to the lower ends of bars 24, which are in turn pivotally connected to braces 25 connected at their rear ends to the upper ends of the hangers 13. The front ends of the braces are connected to a draft bail 26 secured to the lower end of the hangers 13, and extending upwardly and forwardly in a curve therefrom, the front end of the bail carrying a clevis 27. The upper ends of the bars 24 are connected by coiled springs 28 to the bail 26, these springs being provided to equalize the weight of the pitmen 21. The connections between the bars 24 and the braces 25 are made by means of pins or bolts 29 passing through said parts, the braces having a series of perforations 30 for the purpose of adjustment.

On the main frame of the machine is mounted a rock-shaft 31 having arms 32 which are connected by links 33 to the draft bail 26. The rock shaft is fitted with an operating hand lever 34, provided with a latch 35 engageable with a toothed segment 36 carried by the main frame for locking the rock shaft. Inasmuch as the shovel is carried by the hangers 13, and the latter are pivotally mounted, and connected to the draft bail 26, the rocking of the shaft 31 through its connection with the draft bail, swings the hangers on their pivots, thus raising and lowering the shovel, and as the pitmen 21 are also connected to the hangers and to the draft bail by the parts 24 and 25, the screen will rise and lower with the shovel, the bar 24 being connected to that end of the brace 25 which is nearest the draft bail.

Trailing behind the screen composed of the tines 19, is a second screen 37 also composed of parallel spaced tines extending in a wavy line in the direction of the length of the machine, and dragging over the ground at their rear ends. The last mentioned screen is carried by bars 38, it being connected at its front end to the lower end of said bars. The upper ends of the bars 38 are pivotally supported at 39 on the pitmen 21, said ends of the bars terminating in lateral bends 40 engaging the upper edge of the pitmen, whereby the bars are prevented from swinging upwardly on their pivots, and when the pitmen are on the point of raising the front ends of the tines 19 between the tines 12, the screen 37 will be thrust upwardly and forwardly slightly, by the movement of the pitmen.

At 41 are indicated guards for preventing the potatoes from rolling off of the first screen, said guards comprising bars which are secured to the pitmen 21, and extend along the sides of the screen a short distance above the same.

On the rear end of the main frame is mounted a seat 42 for the driver.

In operation, the machine is driven along the row of plants, and the shovels and screens are lowered into operating position. The parts are so adjusted that the shovel enters the ground at a sufficinet depth to pass under the potatoes, and they are dug up or lifted and deposited on the shovel, and carried along the same to its rear end onto the tines 12. The pitmen 21 operate to thrust the front ends of the tines 19 between the tines 12 and to draw them back, carrying on their points the clogs of dirt and the potatoes that have been dug up by the shovel. This movement is repeated, and will throw the potatoes back along the tines 19, allowing the dirt to fall between the latter. The potatoes pass from the tines 19 onto the screen 37, where they receive a further shaking to separate the dirt, as already described, and they finally drop off the rear end of the screen 37 onto the ground.

The machine herein described is simple in structure, and it effectually serves the purpose for which it is designed, the potatoes being deposited on the ground in a row, clear of dirt, and ready to be gathered up and bagged.

I claim:

1. A potato digger comprising a wheeled frame, a shovel carried thereby, tines extending from the rear end of the shovel, a vibrating screen comprising spaced tines extending at their front ends between the aforesaid tines, means for actuating the screen including a pitman connected thereto, a bar pivoted to the pitman, and having a laterally extending portion engaging the edge of the pitman to prevent swing of the bar in one direction, and a screen carried by said bar and trailing behind the aforesaid screen.

2. A potato digger comprising a wheeled frame, hangers pivotally mounted on the frame, a shovel carried by the hangers, a vibrating screen working behind the shovel, a crank shaft carried by the hangers, a pitman connection between the crank shaft and the screen, gearing between the crank shaft and the wheels of the frame, a draft bail connected to the hangers, means connected to the bail for swinging the hangers on their pivots to raise and lower the shovel, braces extending between the draft bail and the hangers, bars loosely connected at one of their ends to the hangers, and pivotally connected intermediate their ends to the braces, and springs connecting the other ends of the bars to the draft bail.

In testimony whereof I affix my signature in presence of two witnesses.

IRBY B. CASEY.

Witnesses:
H. E. SMITH,
NETTIE KING.